(12) United States Patent
Bayer et al.

(10) Patent No.: US 8,115,917 B2
(45) Date of Patent: Feb. 14, 2012

(54) DRYING NOZZLE

(75) Inventors: Alexander Bayer, Niederberg (DE); Peter Brotzmann, Obernburg (DE)

(73) Assignee: Novartis AG, Basel (CH)

( * ) Notice: Subject to any disclaimer, the term of this patent is extended or adjusted under 35 U.S.C. 154(b) by 186 days.

(21) Appl. No.: 12/477,164

(22) Filed: Jun. 3, 2009

(65) Prior Publication Data
US 2009/0310129 A1 Dec. 17, 2009

(30) Foreign Application Priority Data
Jun. 6, 2008 (EP) ..................................... 08157781

(51) Int. Cl.
*G01N 21/00* (2006.01)
(52) U.S. Cl. .................................. 356/239.2; 356/239.1
(58) Field of Classification Search ................ 356/239.2, 356/237.1, 239.1; 239/DIG. 22, DIG. 21, 239/DIG. 7, 290, 434.5, 423, 424, 417, 433, 239/288.5, 425.5, 567; 34/83, 84, 241; 15/300.1, 15/405, 415.1; 206/5.1
See application file for complete search history.

(56) References Cited

U.S. PATENT DOCUMENTS

| | | | |
|---|---|---|---|
| 4,592,509 A | 6/1986 | Moss | 239/424 |
| 6,681,498 B2 | 1/2004 | Steffan | 34/84 |

OTHER PUBLICATIONS

PCT International Search Report dated Sep. 7, 2009.
PCT Written Opinion of the International Searching Authority dated Sep. 7, 2009.

*Primary Examiner* — Tri T Ton
(74) *Attorney, Agent, or Firm* — Robert Ambrose

(57) ABSTRACT

A drying nozzle (1) for drying a peripheral portion of an ophthalmic lens (CL), in particular a contact lens, comprises an inlet (30) for the supply of a pressurized gas and a continuous annular outlet gap (11) having a predetermined width (W) through which the pressurized air is capable of being supplied to the peripheral portion of the ophthalmic lens (CL).

12 Claims, 4 Drawing Sheets

DRYING NOZZLE

This application claims benefit under 35 U.S.C. §119 of European Patent Application No. 08157781.9, filed on Jun. 06, 2008, the contents of which are incorporated herein by reference in its entirety.

FIELD OF THE INVENTION

The present invention relates to a drying nozzle for drying a peripheral portion of an ophthalmic lens, in particular a contact lens.

BACKGROUND OF THE INVENTION

In the production of contact lenses the lenses are typically automatically inspected for defects in the optical zone as well as in the peripheral portion of the lens, since the peripheral portion and in particular the lens edge greatly affects the wearing comfort that is experienced by the user. Contact lenses which are defective either in the optical zone or in the peripheral portion are rejected, at least if predetermined threshold values for identifying such defects are exceeded.

In a known mass production process of contact lenses a viscous starting material is dispensed into a female mold half, the mold is then closed with the aid of the male mold half, and the starting material in the mold is then exposed to UV-light, so that the starting material between the shaping surfaces of the male and female mold halves is crosslinked and/or polymerized to form the contact lens. Subsequently, the mold is opened and the lens so formed is loosened from the mold half to which it sticks by the application of water. Also, the water serves to wash away any excess starting material which has not been crosslinked and/or polymerized. The wet contact lens is then gripped and later in the process the peripheral portion of the lens, in particular the edge of the lens, is automatically inspected. Typically this is done with the aid of image analysis, which itself makes use of a high contrast image (dark background, bright representation of the lens edge).

However, due to the fact that the contact lens the edge of which is to be inspected is still wet (e.g. water droplets adhere to the lens), the automatic inspection system may detect a lens as being defective although it is not. The water droplets cause the lens edge to appear darker in a portion of the lens edge where a small water droplet adheres than in a portion where no such water droplet is present. Since dark portions at the lens edge are interpreted as representing a defect of the lens edge, the lens may be rejected although the lens edge indeed is not defective, thus unnecessarily increasing the reject rate. Previous attempts have been made to improve this misinterpretation by drying the contact lens by means of application of pressurized air with the aid of nozzles having discrete openings, however, this has still resulted in portions at the lens edge which are represented darker so that lenses have been rejected as being defective although they are not.

Accordingly, it is an object to overcome these drawbacks and to provide suitable measures to decrease the number of contact lenses which are rejected as being defective at their lens edge although indeed they are not.

SUMMARY OF THE INVENTION

In accordance with the present invention, this object is achieved by a drying nozzle as it is specified in the independent claim. Further embodiments of the drying nozzle according to the invention are the subject of the dependent claims. Also, a process for the inspection of the peripheral portion of the lens, in particular of the lens edge, is suggested, which uses the drying nozzle according to the invention.

In particular, the drying nozzle for drying a peripheral portion of an ophthalmic lens, in particular a contact lens, comprises an inlet for the supply of a pressurized gas, in particular pressurized air, and a continuous annular outlet gap having a predetermined width. Through the continuous annular outlet gap the pressurized air is capable of being supplied to the peripheral portion of the ophthalmic lens. The continuous annular outlet gap provides for an even distribution of the pressurized air impacting on the lens to be dried and thus reliably and evenly dries the lens in its peripheral portion and in particular at the lens edge, so that the lens edge is represented evenly bright in the high contrast image, so that darker portions of the lens edge are indeed caused by defective portions of the lens edge (e.g. by small tears). Accordingly, unjustified lens rejections due to water droplets or the like can be greatly reduced or even completely avoided, thus reducing the overall rejection rate and increasing the performance of the production process.

In one embodiment of the drying nozzle according to the invention, the width of the continuous annular outlet gap is in the range of 0.2 mm to 0.8 mm, more particularly in the range of 0.4 mm to 0.6 mm, and in particular is about 0.5 mm. These ranges or values, respectively, for the width of the continuous annular outlet gap are suitable for achieving the desired effect.

In a further embodiment of the drying nozzle according to the invention, the nozzle comprises a body and a cap which can be screwed onto the nozzle body in a manner such, that the continuous annular outlet gap is formed between the cap and the body when the cap is screwed onto the body. The body comprises the inlet for the supply of pressurized gas and at least one feed channel extending from the inlet to a plurality of distribution channels, which are arranged to connect the feed channel with the continuous annular outlet gap. This is a particularly advantageous two-part nozzle construction which can easily be assembled and disassembled, as this may be desirable for example to clean the nozzle parts from time to time.

In still a further embodiment of the drying nozzle according to the invention the body and the cap are provided with means for centering the cap on the body upon screwing the cap onto the body. This facilitates screwing and unscrewing of the cap to and from the body in the correct relative orientation.

In yet a further embodiment of the drying nozzle according to the invention, the body is provided at its inlet and along at least a part of the feed channel with an internal thread for connecting a supply duct to the body. This allows to easily and reliably connect and disconnect a supply duct to the body of the nozzle.

In a still further embodiment of the drying nozzle according to the invention, the body comprises a central bore extending axially through the upper surface of the body, and the upper surface of the body is generally concave and converges towards an outlet opening of the central bore. This embodiment is advantageous as it improves cleanliness of the upper surface of the drying nozzle: in case any liquid or dirt adheres to the upper surface, due to the concave shape such liquid or dirt is transported towards the outlet opening of the central bore from where it is blown away by pressurized air exiting through the outlet opening of the central bore.

In still a further embodiment of the drying nozzle according to the invention, the nozzle or the nozzle parts, respectively, are made from a non-corrosive material. This is particularly a requirement in the manufacture of contact lenses, since they are sensitive articles which must be produced under strictly clean conditions.

A further aspect of the present invention relates to a process for the inspection of the peripheral region of an ophthalmic lens, in particular for the inspection of the edge of a contact lens. The process comprises the steps of drying the peripheral area of a wet lens to be inspected by exposing it to pressurized gas, and subsequently automatically inspecting the peripheral area of the lens with the aid of image analysis. The step of exposing the peripheral area of the wet lens to pressurized gas is performed by using a drying nozzle in accordance with one of the embodiments described above, and by arranging the wet lens at a predetermined distance from the continuous annular outlet gap of the nozzle. For arranging the lens to be dried at a predetermined distance from the continuous annular outlet gap, a suitable gripper can be used which grips the lens in the central portion of the lens (e.g. by application of suction) so that the lens edge projects outwardly beyond the gripper so that it may be inspected.

As already mentioned above, in one variant of the process according to the invention the pressurized gas is air. The pressurized air may be applied to the lens through the continuous annular outlet gap with an (over-)pressure in the range of 0.8 to 1.2 bar.

BRIEF DESCRIPTION OF THE DRAWINGS

Further aspects of the drying nozzle or of the process according to the invention will become apparent from the following description of an embodiment of the invention with the aid of the drawings in which.

DETAILED DESCRIPTION

Figure 1:
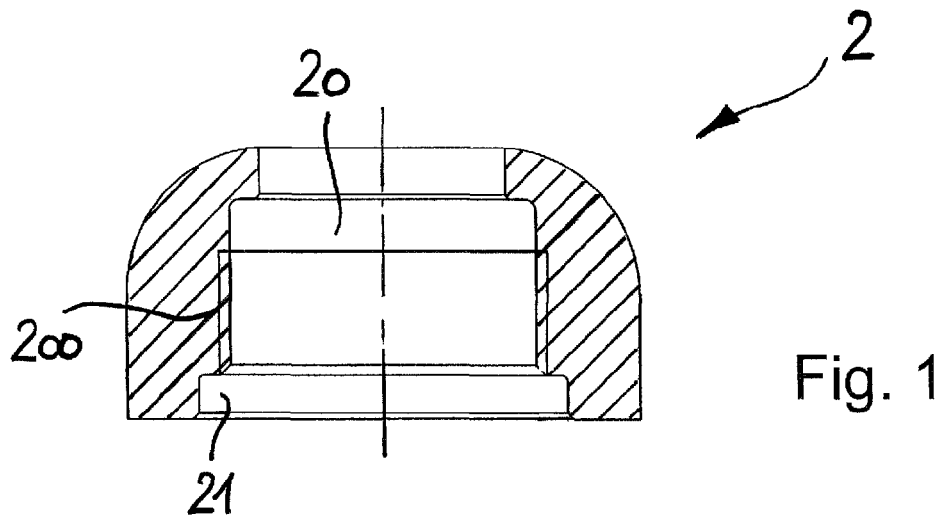
FIG. 1 shows a sectional view of the cap of one embodiment of the drying nozzle according to the invention.
Figure 2:
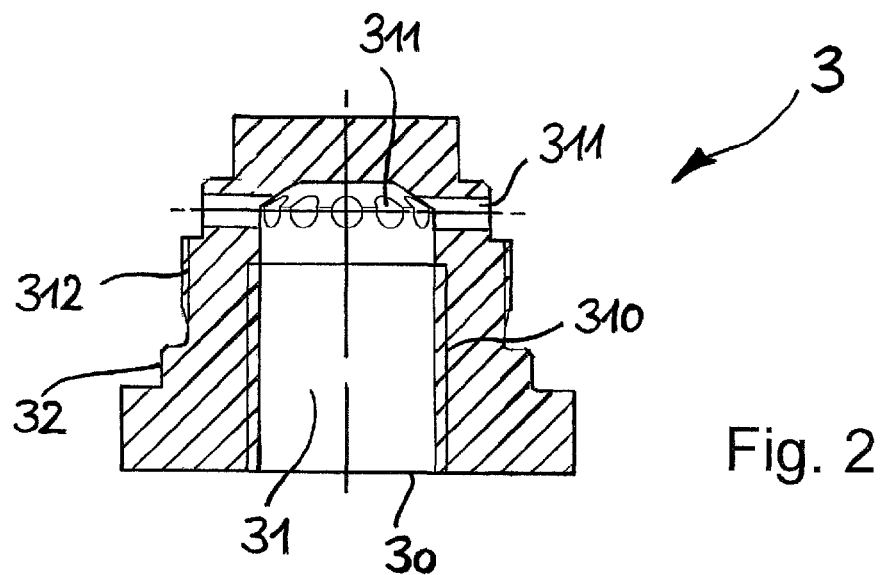
FIG. 2 shows a sectional view of the body of the embodiment of the drying nozzle according to the invention, the cap of which is shown in FIG. 1.
Figure 3:
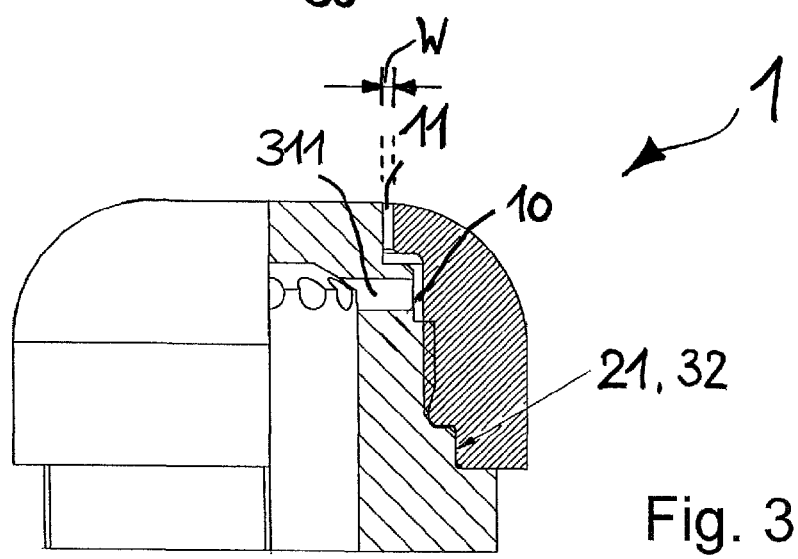
FIG. 3 shows in a partial sectional view the embodiment of the drying nozzle with the cap of FIG. 1 and the body of FIG. 2 in an assembled state.

An embodiment of the drying nozzle 1 according to the invention is shown in FIGS. 1-3, with FIG. 1 showing only the cap 2 of the nozzle, FIG. 2 showing only the body 3 of the nozzle, and FIG. 3 showing the nozzle 1 comprising both the cap 2 and the body 3 in the assembled state.

The cap 2 comprises a centrally arranged cylindrical bore 20 having portions with different inner diameters. One of these portions is provided with an internal thread 200 allowing to screw cap 2 onto body 3. Body 3 is provided with a corresponding external thread on body 3, accordingly. Cylindrical bore 20 further comprises a fitting portion 21 having an inner diameter which corresponds to the outer diameter of a corresponding fitting portion of body 3 in order to cause the cap 2 to get centered during screwing of cap 2 onto body 3.

Body 3 has an inlet 30 and a feed channel 31 defined by a cylindrical bore. Feed channel 31 is at least partly provided with an internal thread 310 allowing to connect a supply duct (not shown) to the body 3 of nozzle 1 by means of a screw connection. From the end remote from inlet 30 a plurality of distribution channels 311 extend radially outwardly from feed channel 31.

Body 3 is further provided with a cylindrical portion that is provided on its outer surface with an external thread 312 for engagement with the internal thread 200 of cap 2 when screwing cap 2 onto body 3. Yet further, body 3 comprises a fitting portion 32 having an outer diameter corresponding to the inner diameter of fitting portion 21 of cap 2 so as to cause the cap to get centered upon screwing cap 2 onto body 3.

Once cap 2 has been screwed onto body 3 (see FIG. 3), the external thread 312 of body 3 is in engagement with the internal thread 200 of cap 2, and the fitting portions 21,32 fittingly mate, so that cap 2 is centered on body 3. At the radial outer ends of the distribution channels 311 a small gap 10 extends towards the upper end of the nozzle 1, where a continuous annular outlet gap 11 is formed between cap 2 and body 3. The continuous annular outlet gap 11 has a width W which is in the range of 0.2 mm to 0.8 mm, more particularly in the range of 0.4 mm to 0.6 mm, and in particular has a width of about 0.5 mm.

As pressurized air is entering feed channel 31 through a supply duct (not shown) which is screwed in through inlet 30 to engage internal thread 310 of feed channel 31, the pressurized air is distributed radially outwardly through the distribution channels 311 into the small gap 10, and is subsequently supplied evenly distributed through continuous annular outlet gap 11.

The nozzle 1 or the nozzle parts, that is to say cap 2 and body 3, are made from a non-corrosive material, for example from anodized aluminum, and preferably can be easily cleaned by unscrewing cap 2 from body 3 and cleaning the individual parts.

Figure 8:
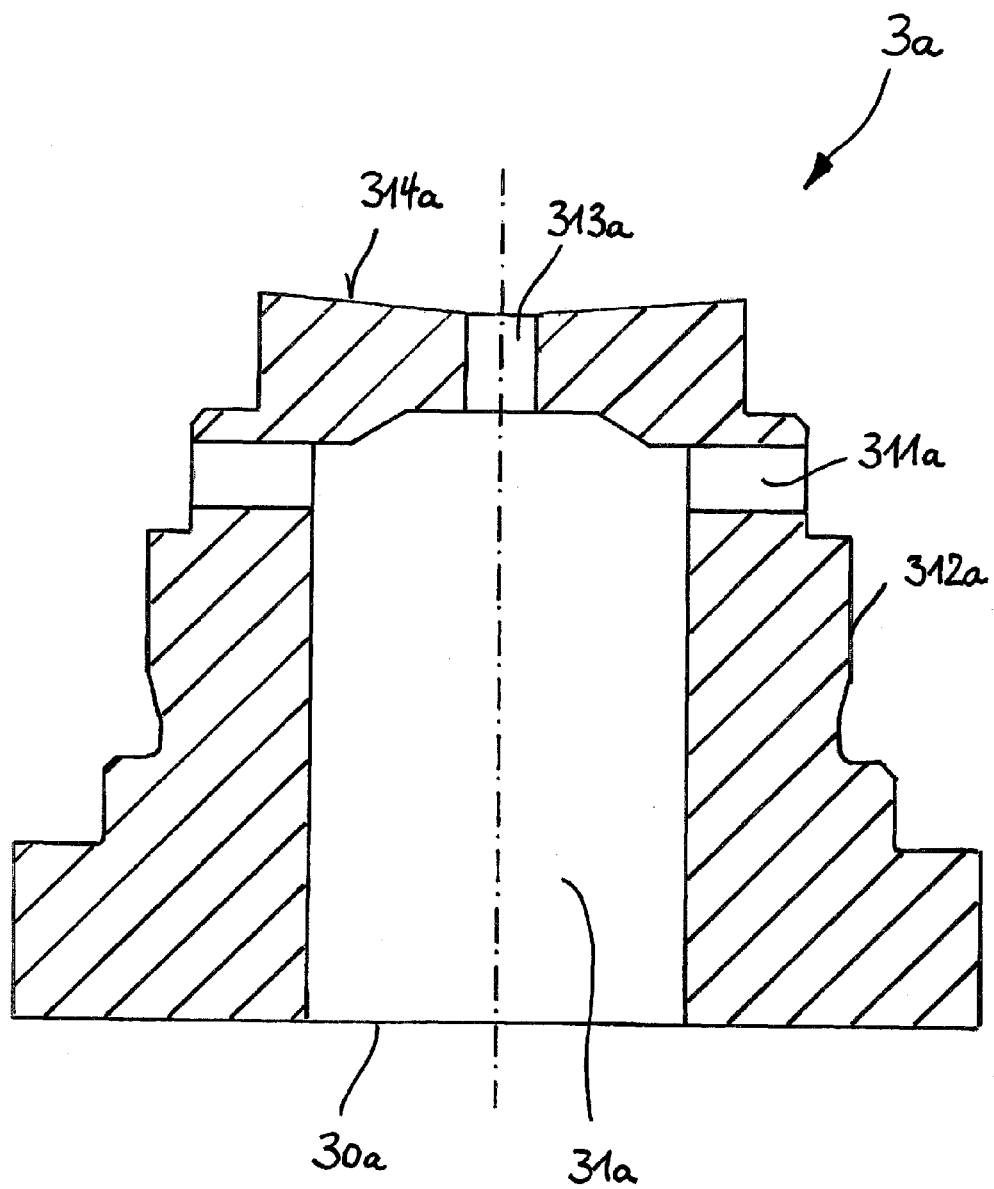
FIG. 8 shows a (greatly enlarged) sectional view of a further embodiment of the body of the drying nozzle according to the invention.

A further embodiment of the body 3a of the drying nozzle according to the invention is shown greatly enlarged in FIG. 8. While this embodiment largely corresponds to the embodiment of body 3 shown in FIG. 2, there are certain differences which will be explained below. Again, body 3a has an inlet 30a and a feed channel 31a defined by a cylindrical bore. While not being shown in FIG. 8, feed channel 31a may again be provided with an internal thread allowing to connect a supply duct (not shown) to body 3a by means of a screw connection. From the end remote from inlet 30a a plurality of distribution channels 311a (only two of them being shown in FIG. 8) extend radially outwardly from feed channel 31a. However, in addition to the radially outwardly extending distribution channels 311a body 3a has a central bore 313a extending axially and having its outlet at upper surface 314a of body 3a. By way of example, central bore 313a may have a diameter between 1 mm and 2 mm and may in particular have a diameter of about 1.6 mm. Upper surface 314a has a generally concave shape (e.g. a conical shape including an angle in the range of between 4° and 5° with the horizontal) converging towards the outlet of central bore 313a. These measures serve to reduce or to eliminate any liquid and/or dirt to accumulate on upper surface 314a. In case there is any liquid or dirt adhering to upper surface 314a, due to the concave shape of upper surface 314a such liquid (e.g. droplets) or dirt is urged towards the outlet of central bore 313a.

The pressurized air exiting through the outlet of central bore 314a then blows away this liquid and/or dirt, thus further improving the cleanliness of the nozzle according to the invention. Similar to the embodiment shown in FIG. 2, body 3a of FIG. 8 is further provided with a cylindrical portion 312a which may be provided on its outer surface with an external thread (similar to FIG. 2, but not shown in FIG. 8) for engagement with the internal thread of the cap when screwing the cap onto body 3a. For further details it is referred to the description of the embodiment shown in FIG. 2 above.

Figure 4:
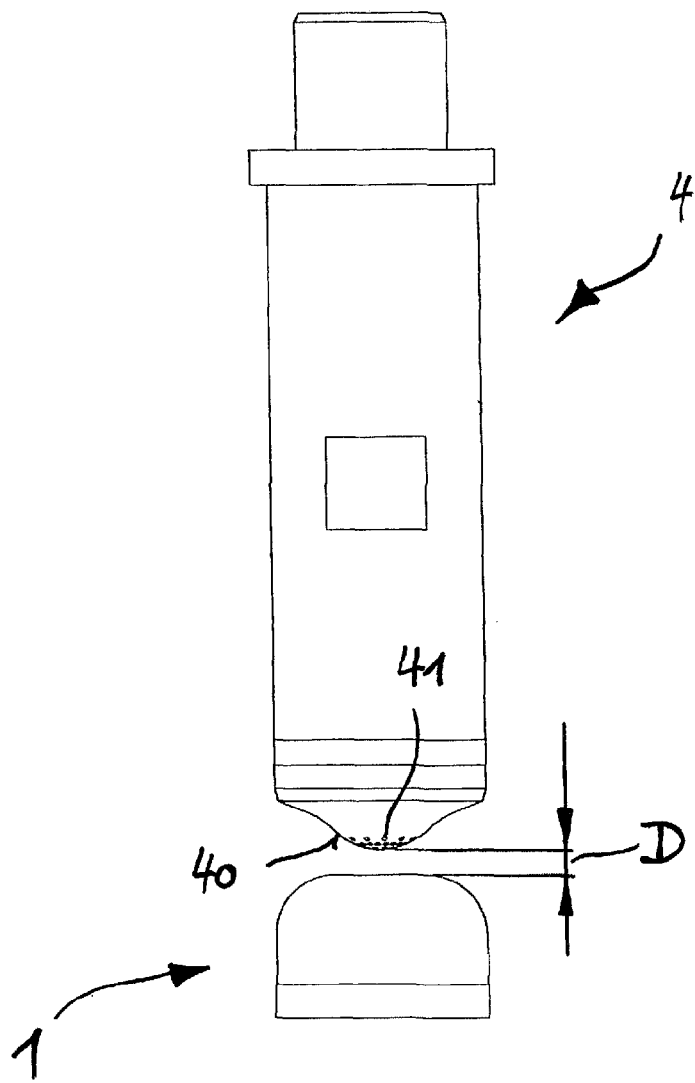
FIG. 4 shows a side view of an embodiment of a gripper suitable for holding a contact lens to be dried, with the drying nozzle being arranged at a predetermined distance from the gripper.
Figure 5:
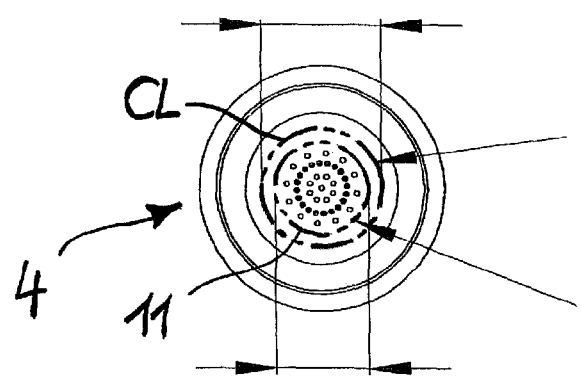
FIG. 5 shows a bottom view of the gripper of FIG. 4 for carrying the contact lens.

From FIG. 4 and FIG. 5 the drying nozzle 1 can be seen in a process of inspecting the peripheral portion of a contact lens which is represented in FIG. 5 through dashed lines CL, in particular of the lens edge. The step of inspection itself is not represented in the drawings, since it is well-known in the art (e.g. production of a high contrast image). Rather, the step of drying of the contact lens with the aid of drying nozzle 1 as described above is shown, since the wet contact lens is to be dried prior to inspection. For presenting the contact lens CL to be dried to nozzle 1, a gripper 4 is provided having a convex distal end surface 40 which is provided with holes 41 through which suction may be applied so as to make the contact lens CL stick to end surface 40 of gripper 4 in a central portion of the lens.

As can be seen best in FIG. 4, drying nozzle 1 is arranged at a predetermined distance D from the continuous annular outlet gap of drying nozzle 1. This distance D may be in the range of 2 mm to 5 mm, and may in particular be about 3 mm. In the bottom view of the gripper 4 for carrying the contact lens, the outer boundary of a virtually present contact lens CL is indicated by dashed lines. For the sake of clarity, the outer diameter of continuous annular outlet gap 11 of nozzle 1 is also indicated by dashed lines. As pressurized air having a pressure in the range of e.g. 0.8 bar to 1.2 bar is supplied and impacts the contact lens CL through the annular outlet gap 11 of nozzle 1, contact lens CL is evenly dried in its peripheral portion and in particular at its lens edge. After that, no more water droplets are adhering there to the contact lens, so that a brightly illuminated contact lens edge can be seen in the high contrast image during inspection (assuming that the lens has no edge defects).

Since suction is applied only in the central portion of the contact lens CL, the lens does only stick to the end surface 40 of gripper 4 in its central portion, that is to say the peripheral portion of the lens and in particular the lens edge does not stick to the end surface 40 of gripper 4, so that it is possible to obtain a clear high contrast image of the lens edge.

As mentioned above, when using the nozzle according to the instant invention any unjustified lens rejections due to water droplets or the like can be greatly reduced or even completely avoided, thus reducing the overall rejection rate and increasing the performance of the production process.

Figure 6:
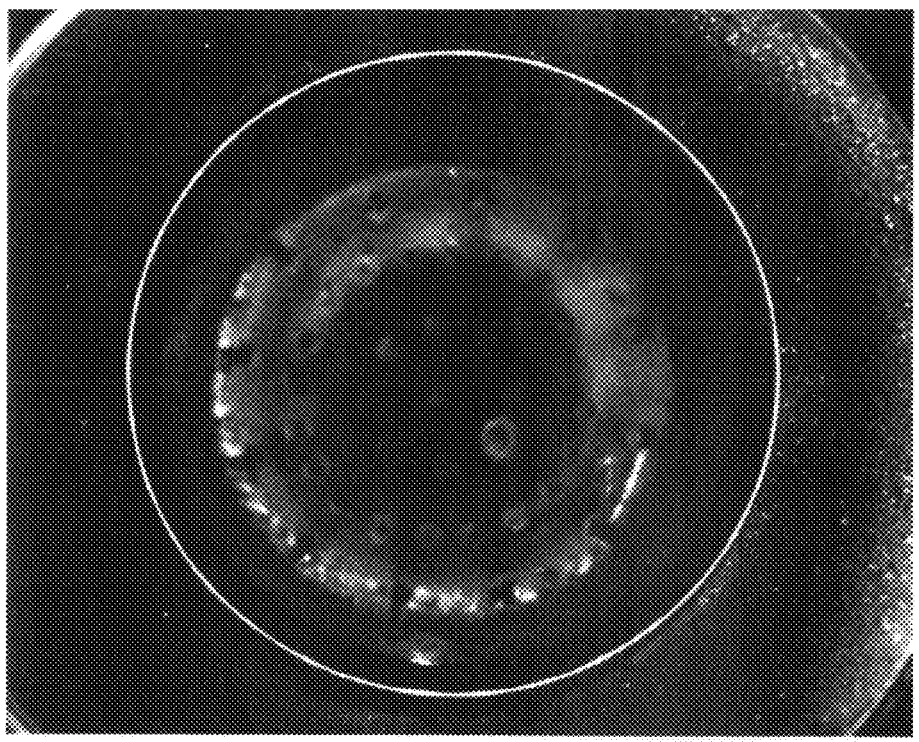
FIG. 6 shows a high contrast image of a contact lens which has been dried in accordance with a prior art nozzle.
Figure 7:
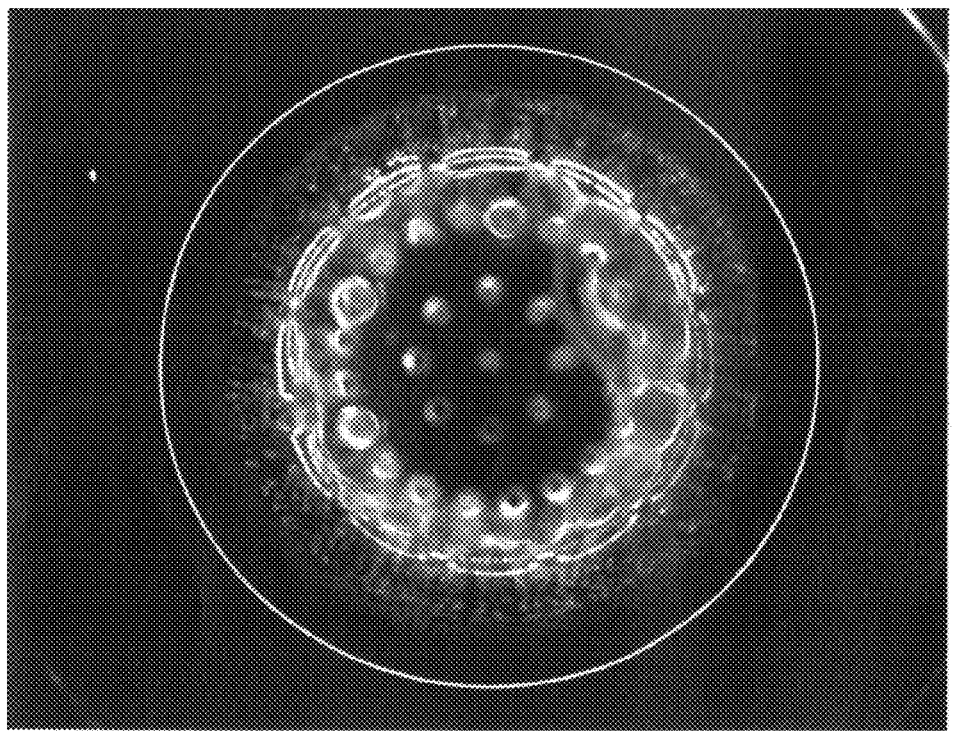
FIG. 7 shows a high contrast image of a contact lens which has been dried in accordance with a nozzle according to the present invention.

This becomes particularly evident when glancing at the high contrast images of a contact lens shown in FIG. 6 and in FIG. 7, with FIG. 6 showing a high contrast image of a contact lens that has been dried in accordance with a prior art nozzle while FIG. 7 shows an image of a contact lens that has been dried using a nozzle as it has been described above in accordance with the present invention.

While the invention has been described with the aid of specific embodiments, alternative embodiments are conceivable as well without departing from the teaching of the present invention. Accordingly, such embodiments are believed to be within the spirit of the scope of protection of the present invention, which is not intended to be limited to the specific embodiments described, but rather is defined through the appended claims.

The invention claimed is:

1. Drying nozzle for drying a peripheral portion of an ophthalmic lens comprising an inlet for the supply of a pressurized gas, and a continuous annular outlet gap having a predetermined width through which the pressurized air is capable of being supplied to the peripheral portion of the ophthalmic lens, wherein the nozzle comprises a body and a cap which can be screwed onto the nozzle body in a manner such, that the continuous annular outlet gap is formed between the cap and the body when the cap is screwed onto the body, the body comprising the inlet for the supply of pressurized gas, at least one feed channel extending from the inlet to a plurality of distribution channels, which are arranged to connect the feed channel with the continuous annular outlet gap.

2. The drying nozzle according to claim 1, wherein the width of the continuous annular outlet gap is in the range of 0.2 mm to 0.8 mm.

3. The drying nozzle according to claim 1, wherein the body and the cap are provided with means for centering the cap on the body upon screwing the cap onto the body.

4. The drying nozzle according to claim 1 wherein the body is provided at its inlet and along at least a part of the feed channel with an internal thread for connecting a supply duct to the body.

5. The drying nozzle according to claim 1 wherein the body comprises a central bore extending axially through the upper surface of the body, and wherein the upper surface of the body is generally concave and converges towards an outlet opening of the central bore.

6. The drying nozzle according to claim 5, wherein the nozzle or the nozzle parts, respectively, are made from a non-corrosive material.

7. Process for the inspection of the peripheral region of an ophthalmic lens comprising the steps of drying the peripheral area of a wet lens to be inspected by exposing it to pressurized gas, and subsequently automatically inspecting the peripheral area of the lens with the aid of image analysis, wherein the step of exposing the peripheral area of the wet lens to pressurized gas is performed by using a drying nozzle comprising an inlet for the supply of a pressurized gas, and a continuous annular outlet gap having a predetermined width through which the pressurized air is capable of being supplied to the peripheral portion of the ophthalmic lens, wherein the nozzle comprises a body and a cap which can be screwed onto the nozzle body in a manner such, that the continuous annular outlet gap is formed between the cap and the body when the cap is screwed onto the body, the body comprising the inlet for the supply of pressurized gas, at least one feed channel extending from the inlet to a plurality of distribution channels, which are arranged to connect the feed channel with the continuous annular outlet gap, and comprising the step of arranging the wet lens at a predetermined distance from the continuous annular outlet gap of the nozzle.

8. The process according to claim 7, wherein the pressurized gas is air.

9. The process according to claim 8, wherein the pressure of the air is in the range of 0.8 to 1.2 bar.

10. The process according to claim 7, wherein the pressure of the gas is in the range of 0.8 to 1.2 bar.

11. The process according to claim 7 wherein the body comprises a central bore extending axially through the upper surface of the body, and wherein the upper surface of the body is generally concave and converges towards an outlet opening of the central bore.

12. The process according to claim 11, wherein the pressure of the gas is in the range of 0.8 to 1.2 bar.

* * * * *